(12) United States Patent
Hsu (10) Patent No.: US 9,740,001 B2
(45) Date of Patent: Aug. 22, 2017

(54) WHEEL AND PROJECTION DEVICE USING THE SAME

(71) Applicant: Coretronic Corporation, Hsin-Chu (TW)

(72) Inventor: Pi-Tsung Hsu, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 102 days.

(21) Appl. No.: 14/837,925

(22) Filed: Aug. 27, 2015

(65) Prior Publication Data

US 2016/0291315 A1 Oct. 6, 2016

(30) Foreign Application Priority Data

Mar. 30, 2015 (CN) .......................... 2015 1 0143707

(51) Int. Cl.
*G03B 21/20* (2006.01)
*G02B 26/00* (2006.01)
*G03B 33/08* (2006.01)

(52) U.S. Cl.
CPC ......... *G02B 26/008* (2013.01); *G03B 21/204* (2013.01); *G03B 33/08* (2013.01)

(58) Field of Classification Search
CPC ........ G03B 21/20; G03B 21/14; G03B 21/16; G02B 26/00; F21V 9/10
See application file for complete search history.

(56) References Cited

U.S. PATENT DOCUMENTS

| | | | |
|---|---|---|---|
| 2003/0035218 A1* | 2/2003 | Hung | G02B 26/008 359/618 |
| 2012/0147601 A1* | 6/2012 | Li | G03B 21/204 362/231 |
| 2013/0027671 A1* | 1/2013 | Miyazaki | F16F 15/324 353/31 |
| 2014/0204558 A1 | 7/2014 | Bartlett | |
| 2015/0036106 A1* | 2/2015 | Nagahara | G03B 21/208 353/31 |
| 2015/0124429 A1* | 5/2015 | Hoehmann | F21V 9/10 362/84 |

FOREIGN PATENT DOCUMENTS

| | | |
|---|---|---|
| CN | 103912849 A | 7/2014 |
| TW | M483456 U | 8/2014 |

\* cited by examiner

*Primary Examiner* — Sultan Chowdhury
*Assistant Examiner* — Danell L Owens
(74) *Attorney, Agent, or Firm* — Li-Jen Shen (57) ABSTRACT

A wheel and a projection device using the same are provided. The wheel includes a wheel plate and a wavelength conversion layer. The wheel plate includes a first surface, a second surface, a through hole, a first groove, and a second groove. The first surface is opposite to the second surface, and forms a coating area and a non-coating area. The through hole is located in the coating area. The second groove is formed on the second surface and protrudes over the first surface to assemble a driver. The wavelength conversion layer is formed in the coating area of the first surface to convert a wavelength of a light beam.

29 Claims, 7 Drawing Sheets

WHEEL AND PROJECTION DEVICE USING THE SAME

FIELD OF THE INVENTION

The present invention relates to a projection device, and more particularly to a wheel and a projection device including the wheel.

BACKGROUND OF THE INVENTION

A projection device is a common electro-optical display device and has been extensively utilized for living entertainments, academic presentation, and business demonstration. According to different display principles, projection devices can be categorized into cathode-ray tube (CRT), liquid crystal display (LCD), digital light processing (DLP), and liquid crystal on silicon (LCoS) projectors.

Projectors, such as DLP projectors, may modulate the light beams from its light source with one or more light valves such as a digital micro-mirror device (DMD), and project images onto a projection screen via a projection optical system. The projectors may perform color separation for color display by using a wheel capable of wavelength conversion.

A typical wheel may comprise phosphor powder and a wheel plate. The area of light exposure of the phosphor powder coated on the wheel plate would increase with rotation of the wheel plate. Calibration of the dynamic balance of the wheel plate is required during production to maintain its rotational stability. Most calibration approaches adopt a carrying unit attached onto the wheel plate, followed by fixing an object for balance onto a specific position of the carrying unit to increase the weight at the specific position. However, attachment of the carrying unit onto the wheel plate tends to decrease the area of heat dissipation of the wheel plate.

Besides, when considering adding a light transmissive sheet with specific optical effects to the wheel plate, a holding component is required to fix the light transmissive sheet onto the wheel plate. However, the addition of the holding component would partially cover the wheel plate and thus decrease the area of heat dissipation of the entire wheel plate. Moreover, addition of the holding component would increase the processing and cost of the production of the wheel, thus raising concerns about the reduction of reliability of the wheel.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The present invention provides a wheel, so as to solve the existing problems of the prior art.

Other advantages and objectives of the invention may be further comprehended through the technical features disclosed in the invention.

In order to achieve one or a portion of or all of the objectives or other objectives, an embodiment of the invention provides a wheel including a wheel plate and a wavelength conversion layer. The wheel plate includes a first surface, a second surface, a through hole, a first groove, and a second groove. The first surface is opposite to the second surface, and forms a coating area and a non-coating area. The through hole is located in the coating area. The second groove is formed on the second surface and protrudes over the first surface, and is used to assemble a driver. The wavelength conversion layer is formed within the coating area of the first surface and is used to convert a wavelength of a light beam.

In an embodiment of the present invention, the first groove is formed on the non-coating area of the first surface.

In an embodiment of the present invention, the wheel further includes a light transmissive sheet covering the through hole. The first groove is located aside the through hole, and the light transmissive sheet interlocks at least partially with the first groove.

In an embodiment of the present invention, the wheel further includes an adhesive binding agent to bind the light transmissive sheet with the first groove.

In an embodiment of the present invention, the first groove is a sector-shaped groove, and the light transmissive sheet is a sector-shaped sheet.

In an embodiment of the present invention, the through hole extends from the coating area to the non-coating area, and two lateral sides and an outer edge of the light transmissive sheet conform with and are closely adjacent to the through hole.

In an embodiment of the present invention, the first groove is located on the second surface.

In an embodiment of the present invention, the wheel further includes a first balancer. The first balancer is disposed inside of the first groove.

In an embodiment of the present invention, the first groove is an annular groove and surrounds an axis of the wheel plate.

In an embodiment of the present invention, the wheel further includes a balancing perforation located in the non-coating area.

In an embodiment of the present invention, the wheel further includes a bending part. The bending part is located on the second surface and connected with an outer edge of the wheel plate.

In an embodiment of the present invention, the wheel further includes a second balancer. The second balancer is disposed on the second surface and is adjacent to the bending part.

In an embodiment of the present invention, the wavelength conversion layer includes a first wavelength conversion material and a second wavelength conversion material. The first wavelength conversion material and the second wavelength conversion material are used to convert the light beam into a first wavelength-converted light beam and a second wavelength-converted light beam, respectively.

In an embodiment of the present invention, the coating area is formed adjacent to an outer edge of the first surface and surrounds the non-coating area.

In order to achieve one or a portion of or all of the objectives or other objectives, another embodiment of the present invention provides a projection device including a light emitting unit, a wheel, a driver, a light valve, and a projection lens. The light emitting unit is used to emit a light beam. The wheel is disposed on a transmission path of the light beam, and includes a wheel plate and a wavelength conversion layer. The wheel plate includes a first surface, a second surface, a through hole, a first groove, and a second groove. The first surface is opposite to the second surface and forms a coating area and a non-coating area. The through hole is located in the coating area. The second groove is formed on the second surface and protrudes over the first surface. The wavelength conversion layer is formed within the coating area of the first surface, and is used to convert a wavelength of the light beam. The driver is assembled onto the second groove of the wheel, and is used to drive a rotation of the wheel plate. The light valve is disposed on the transmission path of the light beam, and is used to modulate the light beam with wavelengths converted by the wavelength conversion layer into an image light beam. The projection lens is disposed on a transmission path of the image light beam.

In another embodiment of the present invention, the first groove is formed on the non-coating area of the first surface.

In another embodiment of the present invention, the wheel further includes a light transmissive sheet covering the through hole. The first groove is located aside the through hole, and the light transmissive sheet interlocks at least partially with the first groove.

In another embodiment of the present invention, the wheel further includes an adhesive binding agent. The adhesive binding agent is used to bind the light transmissive sheet with the first groove.

In another embodiment of the present invention, the driver, the first groove, and the light transmissive sheet form an accommodating cavity. The accommodating cavity is used for accommodating the adhesive binding agent.

In another embodiment of the present invention, the first groove is a sector-shaped groove, and the light transmissive sheet is a sector-shaped sheet.

In another embodiment of the present invention, the through hole extends from the coating area to the non-coating area, and two lateral sides and an outer edge of the light transmissive sheet conform with and are closely adjacent to the through hole.

In another embodiment of the present invention, the first groove is located on the second surface.

In another embodiment of the present invention, the wheel further includes a first balancer. The first balancer is disposed inside of the first groove.

In another embodiment of the present invention, the first groove is an annular groove and surrounds an axis of the wheel plate.

In another embodiment of the present invention, the wheel further includes a balancing perforation located in the non-coating area.

In another embodiment of the present invention, the wheel further includes a bending part. The bending part is located on the second surface and connected with an outer edge of the wheel plate.

In another embodiment of the present invention, the wheel further includes a second balancer. The second balancer is disposed on the second surface and is adjacent to the bending part.

In the projection device of the embodiment of the present invention, the first balancer on the wheel is disposed on a specific position to maintain an overall dynamic balance during rotation. Additionally, the first groove may be formed on the wheel plate by stamping the wheel of the projection device to interlock the light transmissive sheet, so that the wheel may have specific optical effects and maintain heat dissipation capacity of the wheel plate.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
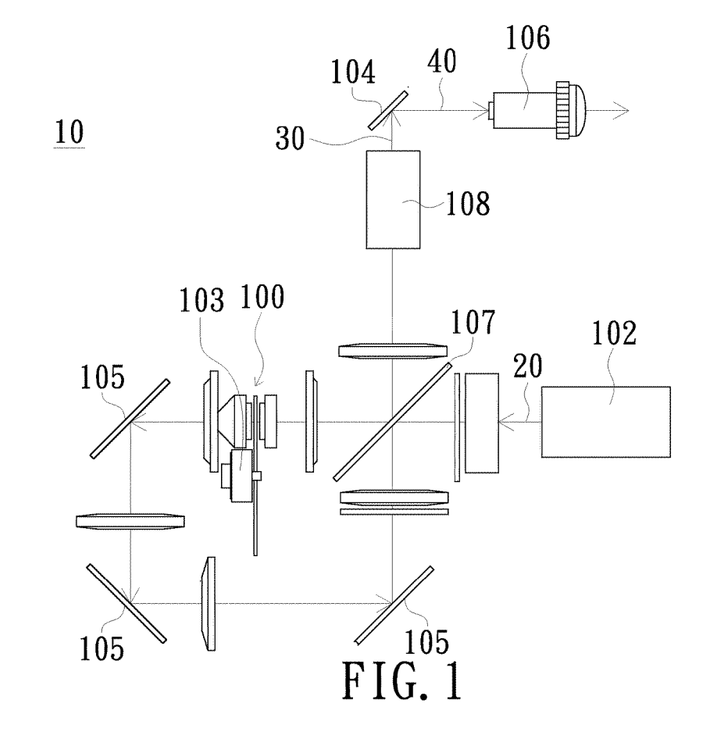
FIG. 1 is a schematic diagram of a projection device of an embodiment of the present invention.

Referring now to FIG. 1 which schematically illustrates a projection device of an embodiment of the present invention. As shown in FIG. 1, a projection device 10 of the present embodiment includes a wheel 100, a light emitting unit 102, a driver 103, a light valve 104, and a projection lens 106. A light beam 20 emitted by the light emitting unit 102 may be projected onto a projection screen (not shown) by the projection lens 106 through conversion by the wheel 100 and the light valve 104. The light emitting unit 102 may include at least one light emitting diode (LED), at least one laser diode, or solid state diodes to emit the light beam 20. For example, the light emitting unit 102 may be at least one blue-ray laser device, but the invention is not limited thereto.

The wheel 100 is disposed on a transmission path of the light beam 20, and is used to convert portions of the light beam 20 into a wavelength-converted light beam; that is, a wavelength of the light beam 20 emitted by the light emitting unit 102 can be altered by the wheel 100, thus forming light beams with other colors. The light beam 20 and the wavelength-converted light beam are mixed and form a mixed light beam 30.

The structural features of the wheel 100 will be explained by referring to FIGS. 2-7. The driver 103 may be assembled onto the wheel 100 to rotate the wheel 100. For example, the driver 103 may be assembled onto the wheel 100 by using a binding agent (e.g. an adhesive; not shown) or other suitable binding means. The driver 103 can drive the rotation of the wheel 100 upon activation. In this embodiment, the driver 103 may be, but not limited to, a motor.

The light valve 104 may be a digital micro-mirror device (DMD), a liquid crystal on silicon (LCoS) panel, a liquid crystal panel, or other suitable components. As the light valve 104 is disposed on a transmission path of the mixed light beam 30, the mixed light beam 30 could be modulated into an image light beam 40 via the light valve 104 after the wavelength of some portions of the light beam 20 is altered by the wheel 100 to form the wavelength-converted light beam and the wavelength-converted light beam mixes with the light beam 20 to form the mixed light beam 30. The image light beam 40 would be projected onto the projection screen (not shown) for viewing via the projection lens 106 disposed on a transmission path of the image light beam 40.

It is to be noted that the quantity and position of the wheel 100 of the present embodiment are merely exemplary and are in no way intended to limit the present invention. In other embodiment, other optical components may be disposed on the transmission path between the light emitting unit 102 and the light valve 104. For example, the optical components may include a lens, a reflective mirror, an integrator rod, an optical splitter, and/or other suitable optical components. Suitable optical components may be disposed within, but not limited to, the optical lens 106.

Figure 2:
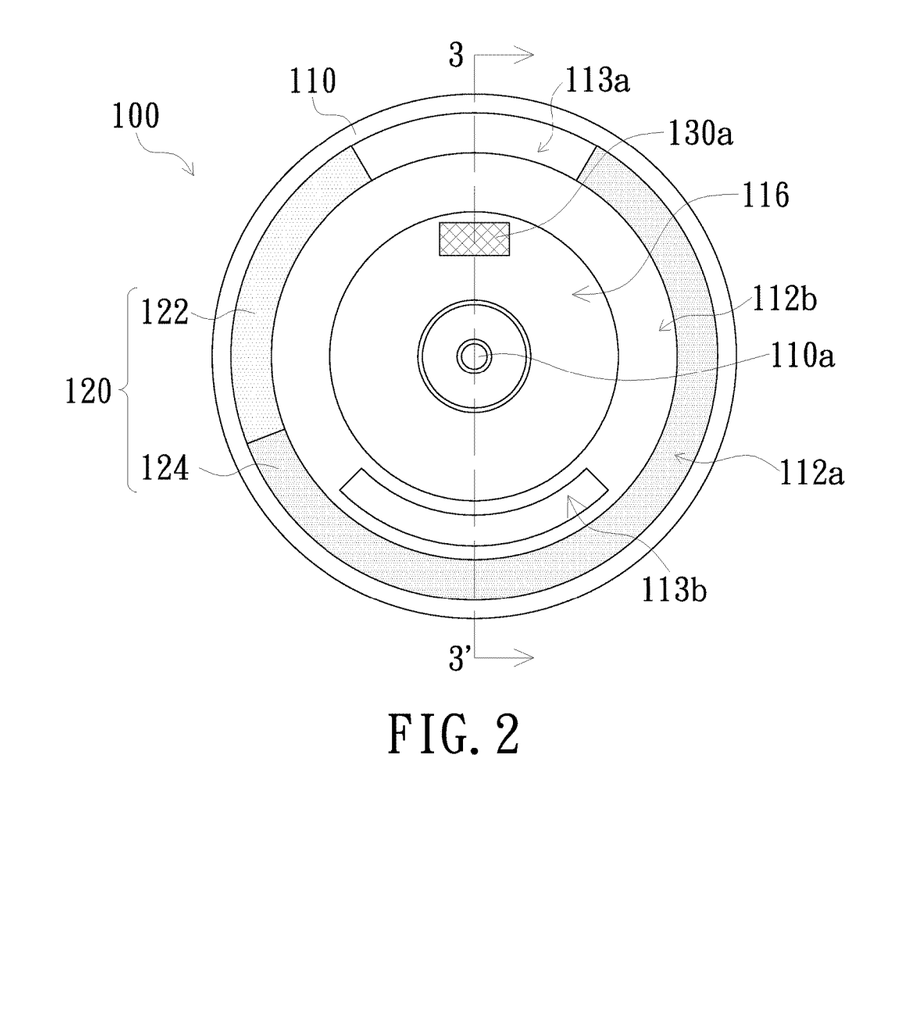
FIG. 2 is a schematic general view of a wheel of another embodiment of the present invention.
Figure 3:
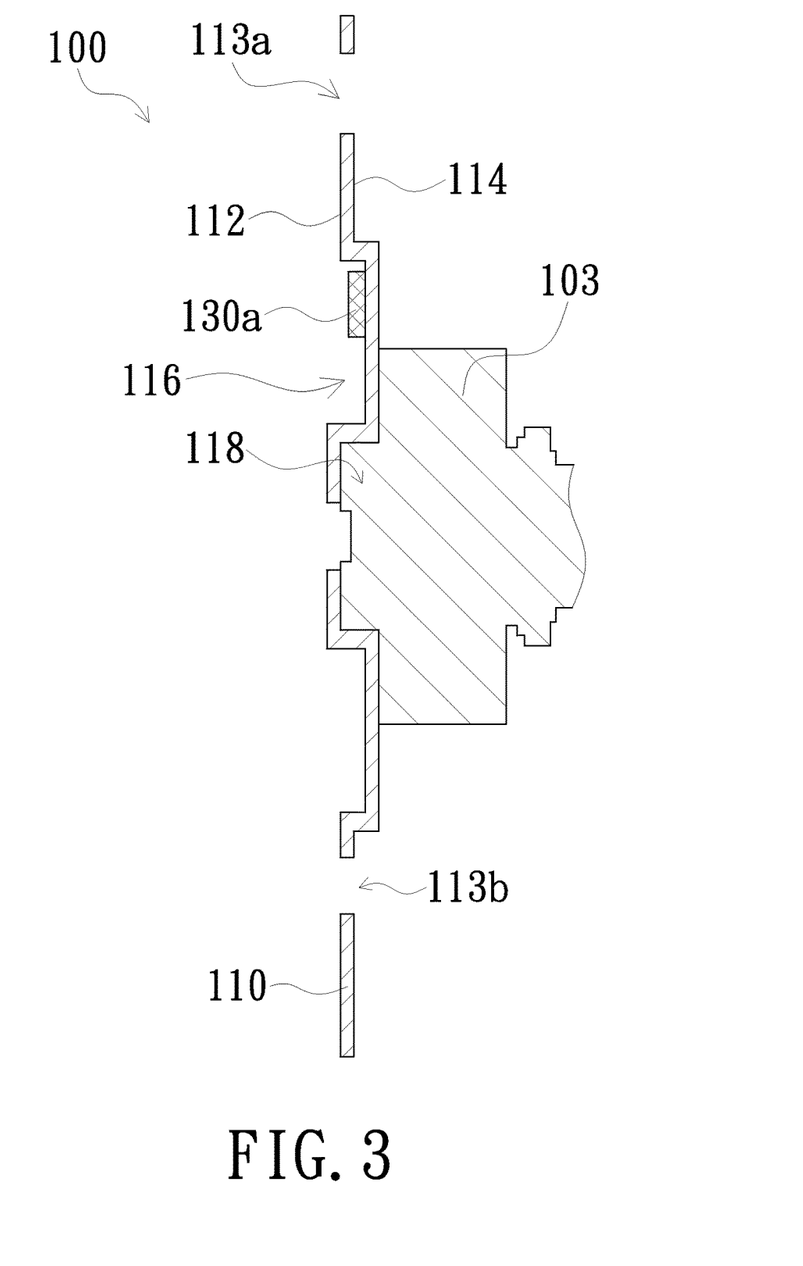
FIG. 3 is schematic cross-sectional view along line 3-3' of the wheel of FIG. 2.

Referring to FIG. 2 and FIG. 3, FIG. 2 illustrates the general view of a wheel of another embodiment of the present invention. FIG. 3 illustrates the cross-sectional view along line 3-3' of the wheel of FIG. 2. As shown in FIG. 2 and FIG. 3, the wheel 100 includes a wheel plate 110 and a wavelength conversion layer 120. The wheel plate 110 may have a disc like shape. The wheel plate 110 includes a through hole 113a, a first groove 116, and a second groove 118. The wheel plate 110 includes a first surface 112 and a second surface 114 that is opposite to the first surface 112. The first surface 112 has a coating area 112a and a non-coating area 112b. The coating area 112a may be arranged in a ring like shape surrounding an axis 110a of the wheel plate 110. In this embodiment, the wheel plate 110 may be a metal plate. The wheel plate 110 may be made of, but not limited to, stainless steel, aluminum, copper, or other rigid material with high thermal conductivity. In some embodiments, the first surface 112 of the wheel plate 110 may be coated with, but not limited to, a reflective material to reflect the wavelength-converted light beam converted by the wavelength conversion layer 120 from the light beam 20 emitted by light emitting unit 102.

On the other hand, the second groove 118 is formed on the second surface 114 and protrudes over the first surface 112 as exemplarily indicated in FIG. 3. The driver 103 may be assembled onto the second groove 118 via an adhesive binder, so as to drive the rotation of the wheel plate 110 of the wheel 100 upon activation.

In this embodiment, the first groove 116 may be formed on the non-coating area 112b of the first surface 112. The first groove 116 is, but not limited to, an annular groove and surrounds the axis 110a of the wheel plate 110. The first groove 116 may be formed by stamping the wheel plate 110 and may provide heat dissipation.

In one embodiment, the wheel 100 further includes a first balancer 130a disposed inside of the first groove 116 to maintain dynamic balance (e.g. compensating the imbalance) during rotation of the wheel plate 110. The first balancer 130a may be, but not limited to, disposed inside of the first groove 116 via an adhesive binder. In one embodiment, the first balancer includes an adhesive binder. The position on which the first balancer 130a of this embodiment is disposed inside of the first groove 116 is merely exemplary. In order to maintain dynamic balance during rotation of the wheel plate 110, the first balancer 130a may be, but not limited to, disposed on a specific position inside of the first groove 116, such as close to the periphery of inside of the first groove. In another embodiment, the wheel 110 of this embodiment may further include a balancing perforation 113b located in the non-coating area 112b outside the first groove 116. The balancing perforation 113b may be used to, but not limited to, maintain dynamic balance during rotation of the wheel plate 110 driven by the driver 103. The position on which the balancing perforation 113b of this embodiment locates in the non-coating area 112b is merely exemplary. In order to maintain dynamic balance during rotation of the wheel plate 110, the balancing perforation 113b may be, but not limited to, formed on a specific position in the non-coating area 112b. In another embodiment, the wheel plate 110 may include, but not limited to, either the first balancer 130a disposed in the first groove 116 or the balancing perforation 113b formed in the non-coating area 112b.

The wavelength conversion layer 120 is formed within the coating area 112a of the first surface 112 and is used to convert the wavelength of the light beam 20. The coating area 112a includes a through hole 113a for some portions of the light beam 20 to pass through. During rotation of the wheel plate 110 of the wheel 100 driven by the driver 103, an area of light exposure of the wavelength conversion layer 120 may increase as the wheel plate 110 rotates. In this embodiment, the coating area 112a may be, but not limited to, formed adjacent to an outer edge of the first surface 112 as exemplarily indicated in FIG. 2. The wavelength conversion layer 120 exemplarily includes a first wavelength conversion material 122 and a second wavelength conversion material 124, which are used to convert the light beam 20 into a first wavelength-converted light beam and a second wavelength-converted light beam, respectively. The wavelength conversion layer 120 may not limited to include two wavelength conversion materials. In other embodiments, the wavelength conversion layer 120 may include more than two wavelength conversion materials or may include only one wavelength conversion material. The wavelength conversion layer 120 may be, but not limited to, formed with phosphor powder or quantum dot phosphor powder, and the first wavelength conversion material 122 and the second wavelength conversion material 124 may be, but not limited to, phosphor powder of different colors, thus generating light beams with different colors upon excitation.

Referring now to FIGS. 1-3, when the light beam 20 emitted by the light emitting unit 102 irradiates the wheel plate 110 rotating under high speed, some portions of the light beam 20 would pass through the wheel plate 110 via the through hole 113a and reach a light uniforming unit 108 (such as an integrator rod or a lens array; shown in FIG. 1) via a plurality of reflective mirrors 105 (shown in FIG. 1); another portions of the light beam 20 would be reflected by the wavelength conversion layer 120, subjected to wavelength conversion, and reach the same light uniforming unit via a optical splitter 107 (shown in FIG. 1) and other optical components. The light beams would then be mixed by the light uniforming unit to generate a mixed light beam 30. For example, the light beam 20 is a blue laser when the light emitting unit 102 is a blue laser source; the first wavelength conversion material 122 of the wavelength conversion layer 120 may be green phosphor powder, while the second wavelength conversion material 124 may be yellow phosphor powder. In some embodiments, a wheel capable of exciting portions of the light beam 20 to generate red light beams (not shown) may be disposed on the transmission path on the light beam 20, so that multiple color light beams can be generated at the same time. Upon formation of the mixed light beam 30 by mixing the light beam 20 by the light uniforming unit, the mixed light beam 30 would be modulated into the image light beam 40 via the light valve 104. The image light beam 40 would then be projected onto the projection screen (not shown) for viewing via the projection lens 106 disposed on the transmission path of the image light beam 40.

Figure 4:
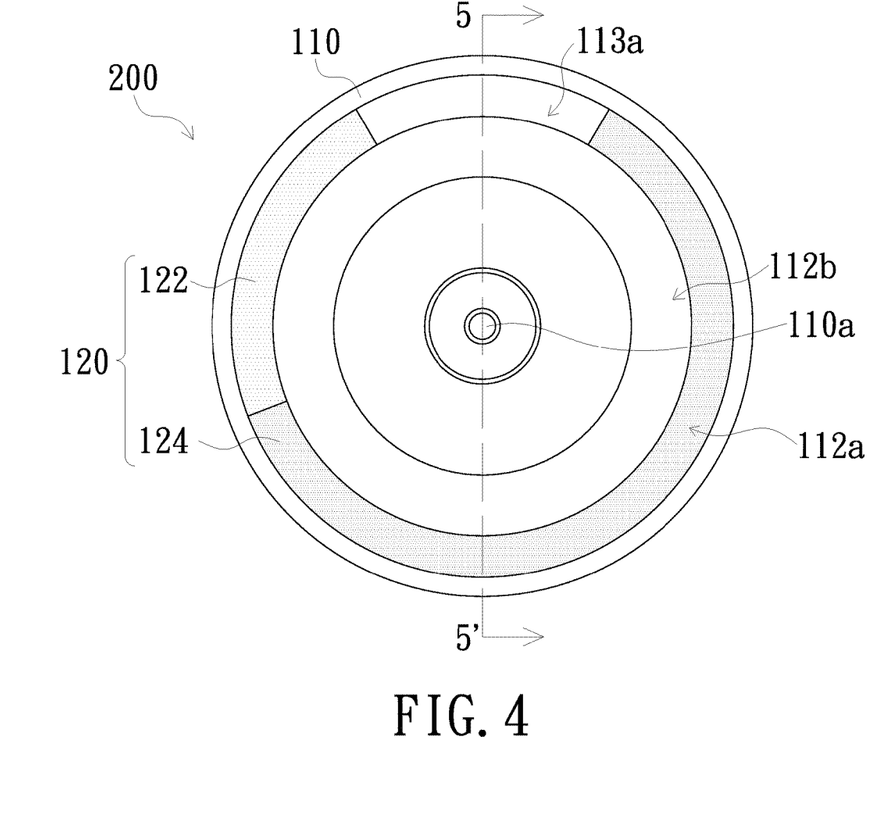
FIG. 4 is a schematic general view of a wheel of another embodiment of the present invention.
Figure 5:
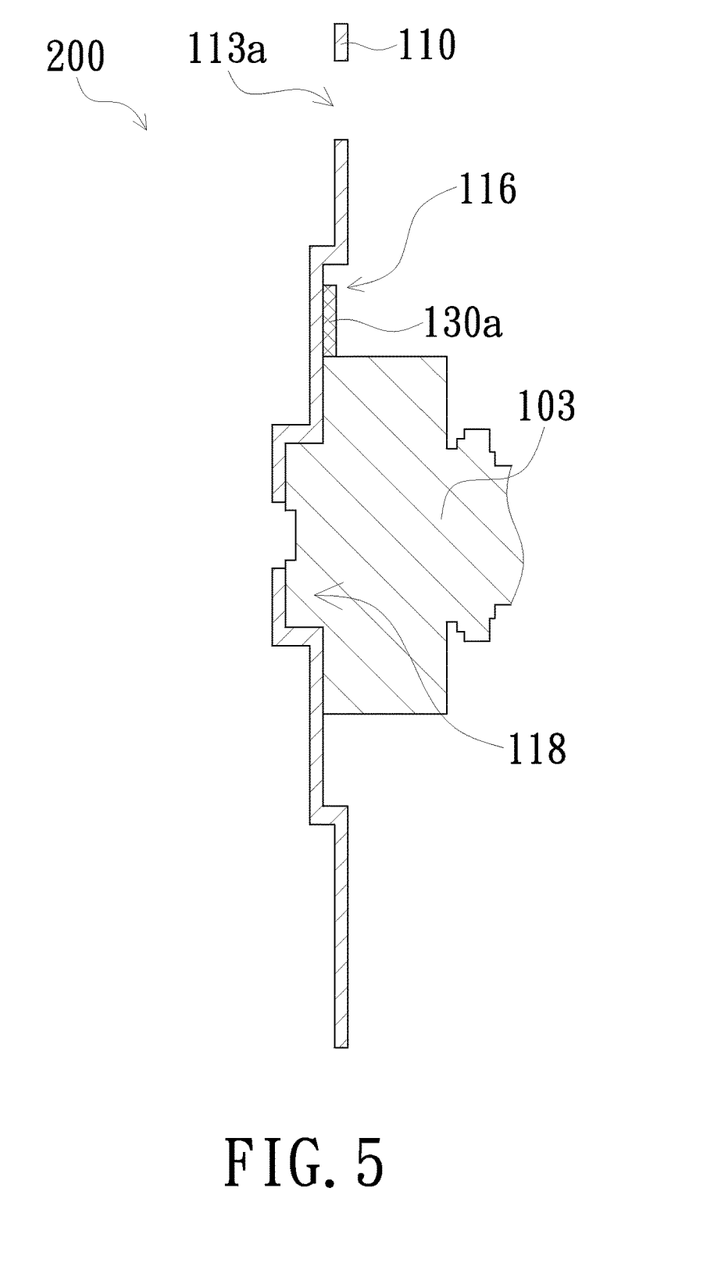
FIG. 5 is schematic cross-sectional view along line 5-5' of the wheel of FIG. 4.

Referring now to FIG. 4 and FIG. 5, FIG. 4 illustrates the general view of a wheel of another embodiment of the present invention. FIG. 5 illustrates the cross-sectional view along line 5-5' of the wheel of FIG. 4. As shown in FIG. 4 and FIG. 5, the wheel 200 of this embodiment includes elements and functions that are substantially identical to those of the wheel 100 of the embodiment shown in FIG. 2 and FIG. 3. The primary difference is that the first groove 116 of the wheel 200 of this embodiment may be formed on the second surface 114. In this embodiment, the first balancer 130a may also be disposed on the second surface 114 to avoid direct irradiation of the light beam 20 (refer to FIG. 1) and diffused light such as UV light generated by the light beam 20 onto the first balancer 130a, so as to, but not limited to, minimize the degradation of adhesive binders used to bind the first balancer 130a and the second surface 114.

Figure 6:
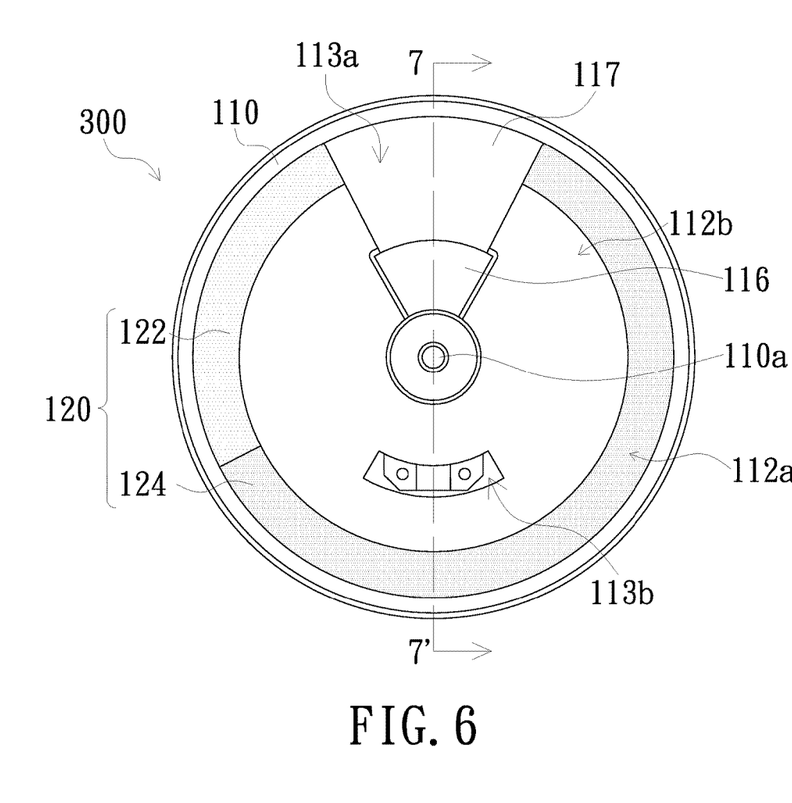
FIG. 6 is a schematic general view of a wheel of yet another embodiment of the present invention.
Figure 7:
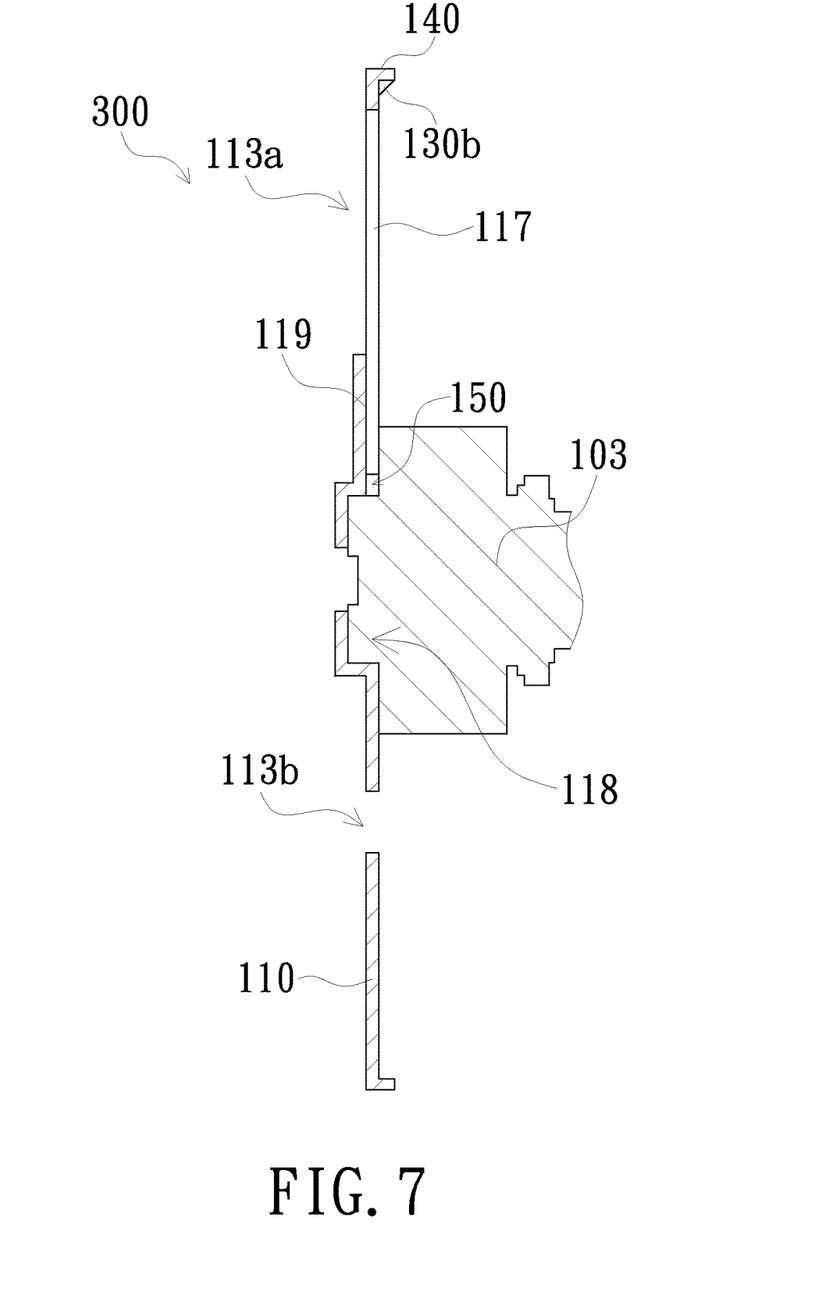
FIG. 7 is schematic cross-sectional view along line 7-7' of the wheel of FIG. 6.

Referring now to FIG. 6 and FIG. 7, FIG. 6 illustrates the general view of a wheel of yet another embodiment of the present invention. FIG. 7 illustrates the cross-sectional view along line 7-7' of the wheel of FIG. 6. As shown in FIG. 6 and FIG. 7, the wheel 300 of this embodiment includes elements and functions that are substantially identical to those of the wheels 100 and 200. The primary difference is that the wheel 300 further includes a light transmissive sheet 117 covering the through hole 113a, in addition to the wheel plate 110 and the wavelength conversion layer 120. The light transmissive sheet 117 may be, for example, made of glass.

The first groove 116 is located aside the through hole 113a on the second surface 114 and may be protruded over the first surface 112, and the light transmissive sheet 117 interlocks at least partially with the first groove 116. As the light transmissive sheet 117 could stably interlock with the first groove 116, overall reliability of the wheel 300 would be maintained during rotation of the wheel plate 110. In this embodiment, the first groove 116 is formed by stamping the wheel plate 110 and thus may also provide heat dissipation. The wheel plate 110 may still possess heat dissipation capacity after the light transmissive sheet 117 is disposed on the wheel 300.

In this embodiment, the first groove 116 may be, but not limited to, a sector-shaped groove, and the light transmissive sheet 117 may be, but not limited to, a sector-shaped sheet. The through hole 113a extends from the coating area 112a to the non-coating area 112b, and two lateral sides and an outer edge of the light transmissive sheet 117 conform with and are closely adjacent to the through hole 113a. In some embodiments, the shape of the light transmissive sheet 117 conforms with the through hole 113a and may, but not limited to, optionally position at a subtle distance away from the through hole 113a.

In one embodiment, the wheel 300 further includes an adhesive binding agent (e.g. adhesive or glue) 119. The adhesive binding agent 119 may be used to, but not limited to, bind the light transmissive sheet 117 with the first groove 116. In other embodiments, the adhesive binding agent 119 may bind two opposite surfaces of the light transmissive sheet 117 to the first groove 116 and the driver 103, respectively. As the adhesive biding agent 119 is disposed within the first groove 116 to bind the light transmissive sheet 117, the first groove 116 could block the direct irradiation of the light beam 20 emitted by the light emitting unit 102 (refer to FIG. 1) and diffused lights such as UV light generated by light beam 20 onto the adhesive binding agent 119, so as to avoid degradation of the adhesive binding agent 119 and thus maintain the overall reliability of the wheel 300.

In this embodiment, the driver 103, the first groove 116, and the light transmissive sheet 117 altogether form an accommodating cavity 150. The accommodating cavity 150 may be used to accommodate extra adhesive binding agent 119. When excess adhesive binding agent 119 flows out between the first groove 116 and the light transmissive sheet 117 during binding of the light transmissive sheet 117 to the first groove 116, the adhesive binding agent 119 could flow into the accommodating cavity 150 accordingly, so that outflow of excess adhesive binding agent 119 to the first surface 112 or the second surface 114 of the wheel plate 110 could be avoided, thus preventing the reduction in heat dissipation efficiency of the wheel plate 110 and potential dynamic imbalance during rotation of the wheel plate 110.

In one embodiment, the wheel 300 may further optionally include a bending part 140. The bending part 140 is located on the second surface 114 and connected with the outer edge of the wheel plate 110. For example, the bending part 140 may be connected with the outer edge of the wheel plate 110 by stamping the wheel plate so that the bending part 140 and the wheel plate 110 is formed in one unit. Meanwhile, the wheel may further optionally include a second balancer 130b. The second balancer 130b may be disposed on the second surface 114 and adjacent to the bending part 140. The second balancer 130b may be fixed onto the second surface 114 by an adhesive binder to maintain dynamic balance during rotation of the wheel plate 110. In one embodiment, the second balancer 130b may be an adhesive binder (e.g.

adhesive; glue). As the second balancer 130b is disposed on the second surface 114 facing away from the light beam 20 emitted by the light emitting unit 102 (refer to FIG. 1), direct irradiation on the adhesive binder between the second balancer 130b and the second surface 114 by the light beam 20 and diffused light generated by the light beam 20 may be avoided, thus preventing detachment of the second balancer 130b from the wheel plate 110. The position on which the second balancer 130b of the present embodiment is disposed on the second surface 114 is merely exemplary; in order to maintain dynamic balance during rotation of the wheel plate 110, the second balancer 130b may be, but not limited to, disposed on a specific position on the second surface 114. In one embodiment, a balancing perforation 113b may also be formed on the non-coating area 112b of the wheel 300 of this embodiment, identical to the wheel 100 of the embodiment illustrated in FIG. 2 and FIG. 3. The balancing perforation 113b may be used to maintain dynamic balance during rotation of the wheel plate 110 driven by the driver 103. Likewise, the bending part 140 may be optionally formed, but not limited to, on the outer edge of the wheel plate 110 in the embodiment of the wheels 100 and/or 200.

According to the embodiments of the present invention, the first balancer or the second balancer may be disposed on corresponding positions on the first surface or second surface of the wheel in the projection device so that overall dynamic balance during rotation of the wheel may be maintained. Additionally, a first groove may be formed on the wheel plate by stamping the wheel of the projection device to interlock with the light transmissive sheet, so as to provide the wheel with specific optical effects and maintain or enhance heat dissipation capacity of the entire wheel plate.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A wheel, comprising:
   a wheel plate, comprising:
      a first surface, forming a coating area and a non-coating area;
      a second surface, opposite to the first surface;
      a through hole, located in the coating area;
      a first groove; and
      a second groove, recessed from the second surface and protruding over the first surface, wherein a driver is assembled to the second groove formed on the second surface to drive a rotation of the wheel plate; and
   a wavelength conversion layer, formed within the coating area of the first surface to convert a wavelength of a light beam.

2. The wheel according to claim 1, wherein the first groove is formed on the non-coating area of the first surface.

3. The wheel according to claim 1, further comprising a light transmissive sheet, covering the through hole, wherein the first groove is located aside the through hole and the light transmissive sheet interlocks at least partially with the first groove.

4. The wheel according to claim 3, further comprising an adhesive binding agent to bind the light transmissive sheet with the first groove.

5. The wheel according to claim 3, wherein the first groove is a sector-shaped groove and the light transmissive sheet is a sector-shaped sheet.

6. The wheel according to claim 5, wherein the through hole extends from the coating area to the non-coating area, and two lateral sides and an outer edge of the light transmissive sheet conform with and are closely adjacent to the through hole.

7. The wheel according to claim 1, wherein the first groove is located on the second surface.

8. The wheel according to claim 1, further comprising a first balancer disposed inside of the first groove.

9. The wheel according to claim 1, wherein the first groove is an annular groove and surrounds an axis of the wheel plate.

10. The wheel according to claim 1, further comprising a balancing perforation located in the non-coating area.

11. The wheel according to claim 1, further comprising a bending part, located on the second surface and connected with an outer edge of the wheel plate.

12. The wheel according to claim 11, further comprising a second balancer disposed on the second surface and adjacent to the bending part.

13. The wheel according to claim 1, wherein the wavelength conversion layer comprises a first wavelength conversion material and a second wavelength conversion material, configured to convert the light beam into a first wavelength-converted light beam and a second wavelength-converted light beam, respectively.

14. The wheel according to claim 1, wherein the coating area is formed adjacent to an outer edge of the first surface and surrounds the non-coating area.

15. The wheel according to claim 3, wherein the first groove is located on the second surface.

16. A projection device, comprising:
a light emitting unit, configured to emit a light beam;
a wheel, disposed on a transmission path of the light beam and comprising:
  a wheel plate, comprising:
    a first surface, forming a coating area and a non-coating area;
    a second surface, opposite to the first surface;
    a through hole, located in the coating area;
    a first groove; and
    a second groove, recessed from the second surface and protruding over the first surface; and
  a wavelength conversion layer, formed within the coating area of the first surface to convert a wavelength of the light beam;
a driver, assembled onto the second groove formed on the second surface of the wheel to drive a rotation of the wheel plate;
a light valve, disposed on the transmission path of the light beam to modulate the light beam with wavelengths converted by the wavelength conversion layer into an image light beam; and
a projection lens, disposed on a transmission path of the image light beam.

17. The projection device according to claim 16, wherein the first groove is formed on the non-coating area of the first surface.

18. The projection device according to claim 16, wherein the wheel further comprises a light transmissive sheet, covering the through hole, the first groove is located aside the through hole and the light transmissive sheet interlocks at least partially with the first groove.

19. The projection device according to claim 18, wherein the wheel further comprises an adhesive binding agent to bind the light transmissive sheet with the first groove.

20. The projection device according to claim 18, wherein the driver, the first groove, and the light transmissive sheet form an accommodating cavity for accommodating the adhesive binding agent.

21. The projection device according to claim 18, wherein the first groove is a sector-shaped groove and the light transmissive sheet is a sector-shaped sheet.

22. The projection device according to claim 21, wherein the through hole extends from the coating area to the non-coating area, and two lateral sides and an outer edge of the light transmissive sheet conform with and are closely adjacent to the through hole.

23. The projection device according to claim 16, wherein the first groove is located on the second surface.

24. The projection device according to claim 16, wherein the wheel further comprises a first balancer disposed inside of the first groove.

25. The projection device according to claim 16, wherein the first groove is an annular groove and surrounds an axis of the wheel plate.

26. The projection device according to claim 16, wherein the wheel further comprises a balancing perforation located in the non-coating area.

27. The projection device according to claim 16, wherein the wheel further comprises a bending part, located on the second surface and connected with an outer edge of the wheel plate.

28. The projection device according to claim 27, wherein the wheel further comprises a second balancer disposed on the second surface and adjacent to the bending part.

29. The wheel according to claim 18, wherein the first groove is located on the second surface.

* * * * *